Dec. 1, 1959     A. B. GRAHAM     2,914,841
MANUFACTURE OF HOLLOW TURBINE BLADES
Filed Oct. 4, 1956
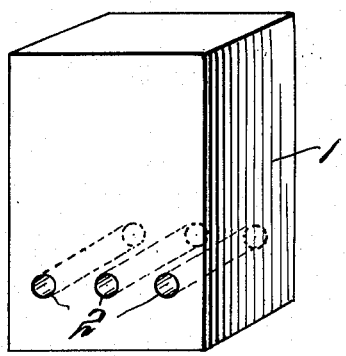
Fig. 1.
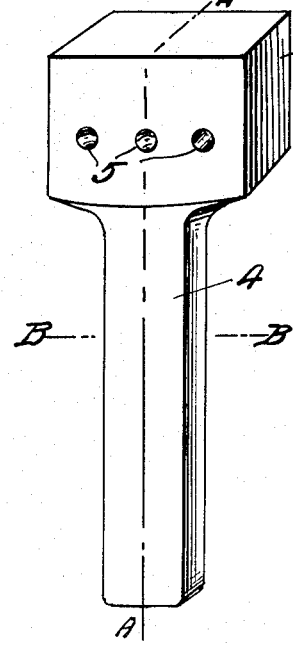
Fig. 2.
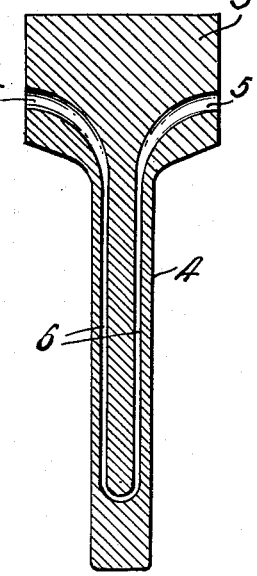
Fig. 2A.
Fig. 2B.
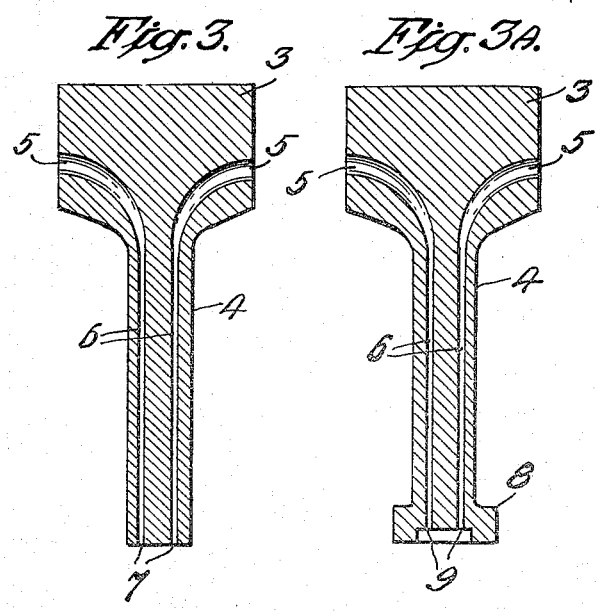
Fig. 3.    Fig. 3A.
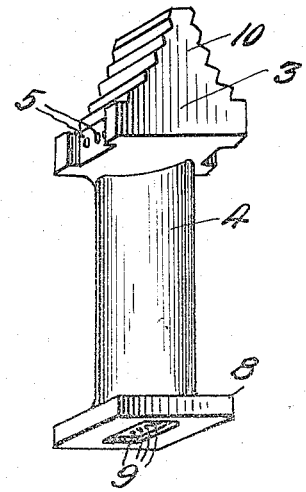
Fig. 4.
INVENTOR.
ALEXANDER BARBOUR GRAHAM
BY
G. W. Deller
ATTORNEY United States Patent Office 2,914,841
Patented Dec. 1, 1959

2,914,841

MANUFACTURE OF HOLLOW TURBINE BLADES

Alexander B. Graham, Whitecraigs, Renfrewshire, Glasgow, Scotland, assignor to The International Nickel Company, Inc., New York, N.Y., a corporation of Delaware Application October 4, 1956, Serial No. 613,871

5 Claims. (Cl. 29—156.8)

The present invention relates to the production of hollow objects and, more particularly, to the extrusion of objects having holes or passages having at least one terminus in the side of the formed object.

It is known that if one or more holes are made in a metallic body and filled with an appropriate material and the body is then hot-worked by extrusion or otherwise, the filler material will flow with the metal. If the filler can be removed by a process which does not affect the metal, the hot-worked body or sections cut from it will still contain holes after the removal of the filler but the size and shape of these will depend on the change which has taken place in the external dimensions of the body and on the nature of the filler. Assuming that the filler behaves in exactly the same way as the metal itself when subjected to deformation, it is possible to elongate the holes and reduce them in cross-sectional area without changing their cross-sectional shape. This can be done, for instance, by axially extruding a billet or the like having a filled hole or holes extending parallel to the axis without changing the cross-sectional shape of the billet or the like. It is also known to make solid turbine and like blades by first producing a billet having approximately the cross section required for the root and then extruding this billet through but not completely through a die to form the blade with an integral root. Subsequently, the blade is machined or otherwise converted into the desired final shape.

If these two processes are combined in order to make blades with passages for cooling fluid in them, the passages will run from the end face of the root longitudinally down the blade. For example, in the known method of extruding a hollow turbine blade with an integral root, a filled billet is partially extruded longitudinally with respect to the filling material through an appropriate die under conditions of uniform flow to form an extruded bade portion and an unextruded root portion. The formed billet is then extracted rearwardly from the integral die or otherwise removed from the open split die in order to maintain the formed condition. Thereafter, the root is shaped and the filler material removed. These operations will produce holes in the turbine blade which run from the end face of the root longitudinally down the blade.

It is sometimes desired to form a hollow body where the holes end in the sides of the formed object. Particularly, turbine designers have been urging that the holes in turbine blades should open on the sides of the root. As far as I am aware, the prior art has not been able to produce holes terminating in the side of the root portion without employing, subsequent to the hot working (i.e., extrusion) operation, a drilling or like operation to form a passage from the side of the root to connect with the linear passage produced by hot working. Due to the nature of the materials normally used for turbine blades, the requirement for subsequent drilling to produce openings in the sides of the root adds considerably to the expense and difficulty of producing products of acceptable quality. Although attempts were made to overcome the foregoing difficulties, none, as far as I am aware, was entirely successful when carried into practice commercially on an industrial scale.

It has now been discovered that hollow objects containing at least one hole or passage which opens on the sides of the object may be produced by an extrusion process.

It is an object of the present invention to provide an extrusion process whereby hollow bodies which contain at least one hole or passage which opens on the side of the body may be produced.

Another object of the invention is to provide an extrusion process whereby hollow objects may be produced which contain at least one substantially U-shaped passage opening on the sides of the object.

The invention also contemplates providing a process whereby a heat resistant metallic mass containing at least one hole therein may be transformed into a turbine blade or other hollow object containing twice as many holes therein as were present in the original mass.

It is a further object of the invention to provide an extrusion process whereby hollow turbine blades may be produced which contain at least one hole or passage which opens on the side of the root.

The invention further contemplates providing an extrusion process whereby hollow turbine blades may be produced which contain at least one substantially U-shaped passage opening on the sides of the root.

Other objects and advantages will become apparent from the following description taken in conjunction with the accompanying drawings in which:

Figure 1 is a representation of a filled billet to be extruded into a turbine blade shape;

Figure 2 depicts a partially extruded filled billet forming a turbine blade blank with an integral root;

Figure 2a shows a vertical section at A—A of said turbine blade blank;

Figure 2b shows an enlarged horizontal section at B—B of the blade portion of said blade blank;

Figure 3 shows a vertical section of a turbine blade blank with passages terminating in the sides of the root and the tip of the blade;

Figure 3a illustrates a vertical section of a turbine blade blank with a shroud produced by upset forging and machined to expose the passages produced therein; and Figure 4 is a completed hollow blade with fir-tree root and a shroud.

Generally speaking, the present invention contemplates a process for the production of hollow objects by extrusion which comprises providing at least one substantially elongated filled passage running transversely to the proposed direction of extrusion in a mass of workable or extrudable metal, such as a billet or the like, and at least partially extruding the filled metal mass through a die orifice in the selected direction. In the usual case, the filled passages run transversely in the billet and the filled billet is extruded longitudinally. After the filled mass is formed by the extrusion and the formed object is removed from the extrusion device, the filler material is removed from the filled passages by any appropriate means. After removal of the appropriate filler material, the extruded object will contain holes or passages which have a substantially U-shape. In the instance where the extrusion is carried out only partially and the filled holes have been properly located in the original mass, the end of each arm of the U will lie in the side or lateral periphery of the unextruded portion of the object. It is within the contemplation of the present invention to employ in this process any extrudable or workable metal in combination with any suitable filler or auxiliary material, subject, of course, to the condition that the filler material be removable from the matrix mass by a physical or chemical means, or a combination thereof, which does not detrimentally affect the matrix mass. Normally, a substantially elongated mass or masses of filler material will be inserted in holes drilled into the metal mass. The filling material can be in the form of bars, rods, wands, etc., or, in the alternative, can be a powder which is compressed or compacted in situ in the drilled holes. It is to be noted that in the novel process the filler material is placed in the metal mass substantially transversely to the proposed direction of reduction in section, i.e., the direction in which the metal flows grossly through the die, and substantially parallel to the proposed direction of reduction, i.e., the direction of the plane in which the section diminishes in dimension. Accordingly, the composite mass is extruded substantially latitudinally or perpendicularly to the direction of the elongated masses of filler material.

While the formation of the U-shaped passages in the extruded mass is the basic product of this process, additional operations may be employed to provide various modifications of the U-shaped configuration. For example, the extruded mass may be sliced to form extruded portions having twice as many filled or unfilled passages as were present in the metal mass prior to extrusion. Alternatively, slicing the end from the extruded portion containing the U-shaped configuration will produce a special configuration wherein the passages will terminate in the sides of the unextruded portion and in the tip of the extruded portion. Again, there will be twice as many filled or unfilled passages as were present in the metal mass prior to extrusion. It should be noted that the composite mass which is formed into an extruded object as described hereinbefore may be, itself, a section cut from a normally extruded length of metal containing filler material. This is a particularly useful variation in the case where the final passages should be minute or of non-circular cross section. The drilling of holes of small or non-circular cross section is notoriously difficult, particularly where the material to be drilled is hard or tough.

The present invention is particularly suitable for the extrusion of a hollow turbine blade blank from heat resistant metal. Referring particularly to the drawings, a billet of heat resistant metal 1 shown in Figure 1 is drilled by any known process to form at least one transverse hole therein and the hole or holes are filled with any suitable filler material to form transverse filled holes 2. The billet with filled holes running transversely is then partially extruded longitudinally through a die having an airfoil section. After the partial extrusion is complete, the formed blade blank shown in Figure 2 is removed from the die either rearwardly or by employing a split die. The blade blank now is comprised of an unextruded root portion 3 and an extruded blade portion 4 and contains filled passages 6 which curve inwardly from the root to run along the blade. Termini 5 of the filled passage are in the side of the unextruded root portion 3 as shown clearly in section in Figure 2a. It is to be noted that termini 5 are the ends of each arm of the U configuration. The extruded blade portion 4, having an airfoil section as shown in Figure 2b, contains the major portion of the U-shaped passage 6. Subsequent operations can be employed to slice off the bottom of the U-shaped passage 6, to form termini 7, in the free end of the blade blank as shown in Figure 3. Sometimes a shroud must be formed on the end of the blade 4 remote from the root. It will be appreciated that in the extruded blade portion 4 there is solid metal beyond the base of the U-shaped passage as shown in Figure 2a which can be upset forged to provided a shroud 8, which is shown in Figures 3a and 4. The filled passages must be appropriately located in the billet to insure that the right amount of solid metal leads the filler in the extrusion. If desired, the overlying metal of the shroud at the central part of the face may be removed my machining to expose the ends of the passages and to form passage termini 9 in the shroud end of the blade. When this machining is performed, the base of each U will be cut into or removed and the result will be that in the finished blade there will be twice as many passages as in the original billet or the like. Figure 4 shows such a completed blade with a fir-tree root 10 and a shroud 8. In the finished blade, the filling material has been removed; the fir-tree root 10 has been machined in the unextruded root portion 3; shroud 8 has been produced by upset forging; termini 9 has been formed by cutting the overlying metal of the shroud; and the blade portion 4 has been finish machined and polished by well-known production methods.

With respect to the manufacture of turbine blades by means of the novel extrusion process, it should be understood that the term "heat resistant metal" is used to include austenitic nickel-chromium, nickel-chromium-iron, cobalt-nickel-chromium, cobalt-chromium and cobalt-chromium-iron alloys which contain at least about 25% nickel plus chromium, cobalt plus chromium or nickel plus chromium plus cobalt in addition to small amounts of aluminum, titanium, molybdenum, tungsten, niobium, tantalum, silicon, manganese, zirconium and boron which may optionally be present in the alloys. These alloys are adapted to be subjected in use to temperatures up to about 700° C. or above and accordingly must be hot worked at temperatures around 1200° C. When extruding these alloys it is preferable to use a lubricant to insure regular flow of the metal through the die orifice. When suitable precautions are taken and a filler material is used which has a deformability at hot-working temperatures similar to the deformability of the heat resistant alloy, it is possible to produce holes or passages in the formed blades which do not substantially deviate within the extruded portion from the average extruded passage cross-sectional area, for example, plus or minus 10%. The passages will have smooth walls and, thus, due to uniformity of dimension and smoothness of walls, they are satisfactory as ducts for efficient fluid cooling of the blades. Titanium-containing ferritic manganese steels and metal-ceramic mixtures, such as magnesia and iron, are known filler materials which are particularly suitable for use in hot working heat resistant metal. Such filler materials are disclosed in the copending Hignett U.S. application Serial No. 472,755 and the Betteridge U.S. application Serial No. 509,380. By varying the composition of these type filler materials, it is possible to match the deformability of hot-workable heat resistant metals. An additional advantage of these filler materials is that they may be removed from heat resisting metal, such as nickel-chromium alloys, by solution in common mineral acids. The heat resistant metal is not readily attacked by these acids and cathodic action affords further protection to the heat resistant article. Despite the advantages of these filler materials, it is within the contemplation of this invention to include the use of any suitable filler material and any suitable means of removing the same from the formed object, including chemical means, physical means, or combinations thereof. The basic criteria of suitability are first that the filler materials have a deformability similar to the metal and secondly the filler material must be capable of removal without detrimentally affecting the configuration of the formed object or the chemical or physical properties of the same.

For the purpose of giving those skilled in the art a better understanding of the invention, the following illustrative example is given.

Example

Alloy: Nickel-chromium base alloy.
 Composition percent:
  Carbon _____ 0.1 max.
  Titanium _____ 1.8–2.7.
  Chromium _____ 18–21.
  Aluminium _____ 0.5–1.8.
  Silicon _____ 1.0 max.
  Manganese _____ 1.0 max.
  Iron _____ 5.0 max.
  Cobalt _____ 2.0 max.
  Nickel _____ Balance.

Filler: Iron-manganese-titanium alloy.
 Composition percent:
  Titanium _____ 1–10.
  Manganese _____ 5–20.
  Carbon _____ Less than 0.5.
  Iron _____ Balance.

Size of billet:
 Area (2¼" x 1")
 Depth, 2¼"

Size of holes: 4, ¼" major axis.

Dimensions of blade:
 Length, 3"
 Aerofoil-chord., max. 1 15/16"
 Width transverse to chord., max. 9/16"

Dimensions of root: Parallelepiped, 2¼" x 1⅛" x 1".

Temperature of extrusion: 1170° C.

The present invention is particularly applicable to the production of hollow turbine blades and more particularly applicable to the production of hollow turbine blades made from heat resistant metal which are adapted to be used under conditions prevailing in gas turbines.

It is to be observed that the present invention provides an extrusion process for the production of hollow bodies, particularly turbine blades which contain at least one U-shaped passage therein. The process may also be employed with additional operations to produce hollow bodies having a plurality of passages therein extending from one tip to another tip or from the tip to the sides of the object.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for the production of an extruded turbine blade adapted to be subjected to conditions prevailing in gas turbines and containing at least one substantially elongated passage, which comprises providing a hot-workable heat-resistant billet-like metal mass which contains at least one substantially elongated mass of filler material therein lying substantially parallel to the direction of the plane in which the section is to diminish in dimension, at least partially extruding said hot-workable heat-resistant billet-like metal mass containing the filler material through an airfoil section die in a direction substantially perpendicular to the direction in which said filler material is disposed to provide at least one filled U-shaped passage therein and subsequently removing said filler material.

2. A process for the production of an extruded turbine blade adapted to be subjected to conditions prevailing in gas turbines having an integral root portion and blade portion and containing at least one substantially elongated passage having at least one terminus in the side of the integral root, which comprises providing a hot-workable heat-resistant metal billet which contains at least one substantially elongated mass of filler material therein lying substantially parallel to the direction of the plane in which the section is to diminish in dimension, said filler material having at least one terminus in the side of said billet, partially extruding said hot-workable heat-resistant metal billet containing the filler material through an airfoil section die in a direction substantially perpendicular to the direction in which said filler material is disposed to provide at least one filled U-shaped passage therein having a terminus thereof remaining in the side of the unextruded root portion, removing the formed billet from the extrusion device and subsequently removing said filler material.

3. A process for the production of an extruded turbine blade adapted to be subjected to conditions prevailing in gas turbines having an integral root portion and blade portion and containing at least one substantially elongated U-shaped passage opening on the sides of said integral root which comprises providing a hot-workable heat-resistant metal billet which contains at least one substantially elongated mass of filler material therein lying substantially parallel to the direction of the plane in which the section is to diminish in dimension, said filler material having termini in opposite sides of said billet, partially extruding said hot-workable heat-resistant metal billet containing the filler material through an airfoil section die in a direction substantially perpendicular to the direction in which said filler material is disposed to provide at least one filled U-shaped passage therein having the termini thereof remaining in the sides of the unextruded root portion, removing the formed billet from the extrusion device and subsequently removing said filler material.

4. A process for the production of an extruded turbine blade adapted to be subjected to conditions prevailing in gas turbines having an integral root portion, blade portion and shroud and containing at least one substantially elongated U-shaped passage opening on the sides of said integral root which comprises providing a hot-workable heat-resistant metal billet which contains at least one substantially elongated mass of filler material therein lying substantially parallel to the direction of the plane in which the section is to diminish in dimension, said filler material having termini in opposite sides of said billet, partially extruding said hot-workable heat-resistant metal billet containing the filler material through an airfoil section die in a direction substantially perpendicular to the direction in which said filler material is disposed to provide at least one filled U-shaped passage therein having the termini thereof remaining in the sides of the unextruded root portion, removing the formed billet from the extrusion device, upset forging the metal leading the extrusion to provide a shroud and subsequently removing said filler material.

5. A process as set forth and described in claim 4 wherein the overlying metal of the shroud is cut through to expose the bottom of the U-shaped passage prior to removing the filler material.

References Cited in the file of this patent

UNITED STATES PATENTS

| | | |
|---|---|---|
| 1,943,560 | Squires _____ | Jan. 16, 1934 |
| 2,013,622 | Bedford _____ | Sept. 3, 1935 |
| 2,638,663 | Bartlett et al. _____ | May 19, 1953 |
| 2,669,769 | Peterson _____ | Feb. 23, 1954 |

FOREIGN PATENTS

| | | |
|---|---|---|
| 755,610 | Great Britain _____ | Apr. 30, 1953 |
| 154,770 | Australia _____ | Jan. 14, 1954 |